(12) United States Patent
Menon

(10) Patent No.: US 9,516,003 B2
(45) Date of Patent: Dec. 6, 2016

(54) UNIFIED CLOUD COMPUTING NETWORK INTERFACE

(71) Applicant: Nimbuz, Inc., Saratoga, CA (US)

(72) Inventor: Raghavan Menon, Saratoga, CA (US)

(73) Assignee: CACHE CLOUD LLC, Los Altos, CA (US)

( * ) Notice: Subject to any disclaimer, the term of this patent is extended or adjusted under 35 U.S.C. 154(b) by 192 days.

(21) Appl. No.: 13/843,945

(22) Filed: Mar. 15, 2013

(65) Prior Publication Data

US 2013/0219466 A1 Aug. 22, 2013

Related U.S. Application Data

(63) Continuation-in-part of application No. 13/610,889, filed on Sep. 12, 2012.

(60) Provisional application No. 61/533,742, filed on Sep. 12, 2011.

(51) Int. Cl.
*G06F 15/16* (2006.01)
*H04L 29/06* (2006.01)
*H04L 29/08* (2006.01)

(52) U.S. Cl.
CPC ............ *H04L 63/08* (2013.01); *H04L 63/102* (2013.01); *H04L 67/02* (2013.01)

(58) Field of Classification Search
CPC ......... H04L 63/08; H04L 63/102; H04L 67/02
USPC .............. 709/217–219, 223–226; 726/8, 1–3
See application file for complete search history.

(56) References Cited

U.S. PATENT DOCUMENTS

| | | | |
|---|---|---|---|
| 7,277,946 B2 | 10/2007 | Humphrey et al. | |
| 8,190,740 B2* | 5/2012 | Stienhans | G06F 9/5083 709/224 |
| 8,332,517 B2* | 12/2012 | Russell | H04L 67/306 709/226 |
| 2002/0073204 A1 | 6/2002 | Dutta et al. | |
| 2004/0128013 A1* | 7/2004 | Blawat et al. | 700/100 |
| 2008/0209039 A1* | 8/2008 | Tracey et al. | 709/225 |
| 2010/0211637 A1 | 8/2010 | Borzsei et al. | |
| 2010/0274983 A1 | 10/2010 | Murphy et al. | |
| 2010/0287219 A1* | 11/2010 | Caso et al. | 707/827 |
| 2011/0113142 A1 | 5/2011 | Rangegowda et al. | |
| 2011/0173337 A1* | 7/2011 | Walsh et al. | 709/229 |
| 2011/0225640 A1* | 9/2011 | Ganapathy et al. | 726/8 |
| 2012/0016838 A1 | 1/2012 | Arai et al. | |
| 2012/0042162 A1 | 2/2012 | Anglin et al. | |
| 2012/0117534 A1 | 5/2012 | Hershenson et al. | |

(Continued)

OTHER PUBLICATIONS

Non-Final Office Action dated May 21, 2015 for U.S. Appl. No. 13/844,103, 12 pages.

(Continued)

*Primary Examiner* — Bharat N Barot
(74) *Attorney, Agent, or Firm* — Kilpatrick Townsend & Stockton LLP

(57) ABSTRACT

A cloud computing network device is disclosed. The device is configured to receive a request from a joining device for access to the cloud computing network, and in response to the request, authenticate the joining device according to an authentication protocol. The device is also configured to receive from the joining device an indication of one or more items local to the joining device to be made available to other devices on the cloud computing network, and in response to the indication, provide information identifying items to the other devices on the cloud computing network.

19 Claims, 8 Drawing Sheets

(56) References Cited

U.S. PATENT DOCUMENTS

| | | |
|---|---|---|
| 2012/0331394 A1 | 12/2012 | Trombley-Shapiro et al. |
| 2013/0041931 A1* | 2/2013 | Brand .......................... 709/203 |
| 2013/0097306 A1* | 4/2013 | Dhunay .............. H04L 12/6418 |
| | | 709/224 |
| 2013/0110967 A1 | 5/2013 | Ueoka et al. |
| 2013/0123004 A1 | 5/2013 | Kruglick |
| 2014/0052867 A1* | 2/2014 | Lucovsky ........... H04L 63/0815 |
| | | 709/226 |
| 2014/0074941 A1 | 3/2014 | He |
| 2014/0157363 A1 | 6/2014 | Banerjee |

OTHER PUBLICATIONS

Non-Final Office Action dated May 14, 2014 for U.S. Appl. No. 13/844,103, 9 pages.
Final Office Action dated Oct. 16, 2014 for U.S. Appl. No. 13/844,103, 12 pages.
Non-Final Office Action dated Oct. 3, 2014 for U.S. Appl. No. 13/610,889, 12 pages.

* cited by examiner

UNIFIED CLOUD COMPUTING NETWORK INTERFACE

CROSS REFERENCE TO RELATED APPLICATIONS

This application is a continuation-in-part of U.S. patent application Ser. No. 13/610,889, filed Sep. 12, 2012, which claims the benefit of U.S. Provisional Application No. 61/533,742, filed Sep. 12, 2011. The above-referenced applications are hereby incorporated by reference in their entirety and for all purposes.

FIELD OF THE INVENTION

The present invention relates, generally, to cloud computing networks and, more particularly, to systems and methods for storing data on a cloud network.

BACKGROUND OF THE INVENTION

A network of computing resources (e.g. hardware, software, memory, and peripherals), which are connected through a network, such as the Internet, may be referred to as a cloud computing network or a cloud. Devices (e.g. desktop computers, phones, laptop computers, and servers) which have access to a cloud, can utilize the computing resources of the cloud. In some implementations, given proper access authority, devices can access other devices connected to the cloud.

Devices connected to the cloud interact with other cloud components using numerous interfaces. For example, with a laptop computer, a user can interact with the Internet using a browser. The user may interact with another PC using VPN software, may interact with data on other machines using peer-to-peer sharing software.

SUMMARY OF THE INVENTION

Some implementations provide a cloud controller configured to manage access among devices connected to a cloud computing network. The cloud controller includes an input port configured to receive input data from a joining device, an output port configured to transmit signals indicative of output data to the joining device, and a processor. The processor is configured to receive a request from a joining device for access to the cloud computing network, and in response to the request, authenticate the joining device according to an authentication protocol. The processor is also configured to receive from the joining device an indication of one or more items local to the joining device to be made available to other devices on the cloud computing network, and in response to the indication, provide information identifying items to the other devices on the cloud computing network.

BRIEF DESCRIPTION OF THE DRAWINGS

The accompanying drawings, which are incorporated in and constitute a part of this specification, illustrate implementations of inventive concepts and, together with the description, serve to explain various advantages and principles of the invention.

DETAILED DESCRIPTION OF THE INVENTION

Reference is made to implementations illustrated in the accompanying drawings. The same reference numbers are generally used throughout the drawings and the following description to refer to the same or like parts.

Figure 1:
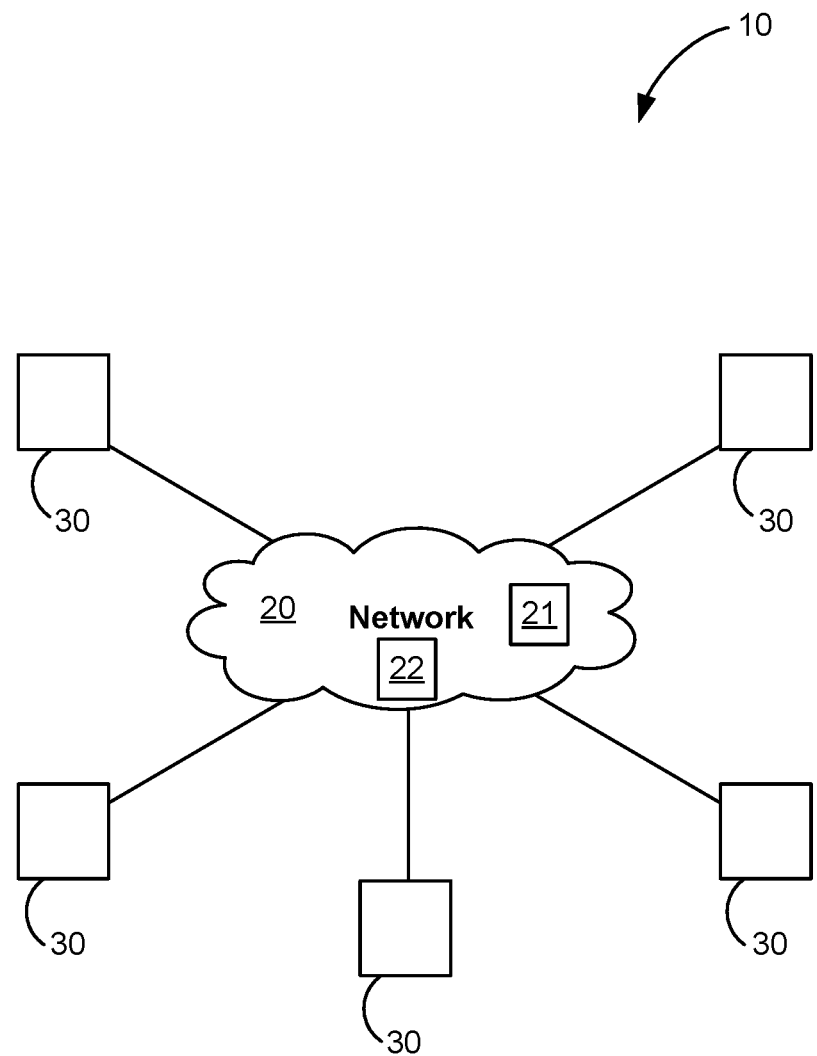
FIG. 1 is a block diagram illustrating an implementation of a cloud computing network.

FIG. 1 is a block diagram illustrating an implementation of a cloud computing network. As shown, the network 10 includes communications network 20 and a plurality of devices 30. In this implementation, the communications network 20 includes cloud controller 21 configured to manage access among devices of the cloud computing network.

The communications network 20 may include, for example, computing resources such as servers, routers, computational resources, memory, databases, software, services such as printing, and the like. In some implementations, the network resources 20 are understood to be always available for use by the devices 30 at least to allow the devices 30 to communicate with one another and with the resources of the network 20.

The devices 30 may include such devices as desktop computers, phones, laptop computers, and servers. The devices 30 may be selectively connectable to the communications network resources 20. For example, a user may turn on a laptop computer, connect to the cloud, access a file from another device 30, and then disconnect from the cloud.

In various implementations, all of a user's data from all of his devices including without limitation computers, smartphones, online cloud storage services, and offline pluggable hard drives is accessible through a single interface. The user's data may also include all data that has been shared with the user by others. In addition, all of the services available to the user may also be available through a single interface. The single interface provides a virtual cloud for the user which can be accessed, searched, browsed, managed, replicated, backed up, or otherwise used from anywhere. Any portion of the virtual cloud can be shared with others with access controls that control what the others can do with the shared virtual cloud data.

A person today generates an enormous amount of data in his personal life. Examples include, for example, the following:

1. Video from HD camcorders. Many users would like to archive their unedited videos with minimal compression. This is 8 GB per hour in 1080p even with the 2nd highest rate (17 Mbits/sec). One hour of video per week on average results in over 400 GBytes of video per year. This data is only going to increase with 3D.

2. Photos from digital cameras with increasing resolution. Many users would like to archive their unedited and possibly uncompressed photos in RAW formats. With 16 Mbytes per image (10 mega pixel RAW), storing 100 images per month results in 20 GBytes of storage per year.

3. Scanned versions of personal documents.

4. Photos and videos from smart phones.

5. Some people envision systems to allow people to "record their life" with video and audio capturing every moment of a person's life and providing a searchable memory that never fades. Such systems will generate terabytes of very sensitive data for every user each year.

People also have sets of critical irreplaceable documents that they like to have scanned versions kept in secure encrypted storage to be accessed from anywhere. Businesses and other organizations have teams that need large amounts of storage with fine grained sharing controls. Today, large amounts of very sensitive data like this are kept inside the person's home or personal computers.

Various implementations provide access to all data (including data that has been shared), from anywhere, and allow sharing of any portion of our data with anyone. In addition, high security and fine grained access control our also provided.

Various implementations additionally or alternatively provide a new paradigm for managing providers of services (including providers of storage) that allows for access from anywhere, sharing with fine grained control, security, provides a framework for value added services like backups, data caching for improved performance, global searches, and allows extreme ease of use, for example, with one click creation of access tokens and URL's that provide controlled access to the service or data to individual users or groups of users.

The various implementations create a virtual cloud for each user or each device, which contains everything that the user or device has access to. The virtual cloud is a single point of access to everything in the virtual cloud. The user can share any portion of the virtual cloud with any other user with access control that indicates the other user's access and use privileges. For example, the other user may be granted read only access, read/write access, ability to re-share it with different access control, service specific controls etc. Each user, with their own virtual cloud sees all of their own devices, data, and services as well as everything that has been shared with them.

Each computing device or user may register with a virtual cloud controlling entity by providing credentials that allow it to join an existing virtual cloud or start a new virtual cloud. The device or user can also publish a list of what it is making visible to the virtual cloud. The list itself may be at least partly searchable and at least partly hidden.

A device can become part of multiple virtual clouds which may see common or different portions of data or services on that device. In some implementations, portions of files may be shared. The registration and token generation steps can also happen in one operation which results in a sharable token that provides access to that portion of that file for a limited time (if specified). A user may provide continuous access to a device through the cloud. The device runs a server that allows the cloud to contact it (and wake it up if needed from power save) to access the services it is sharing on the cloud. A user may provide temporary access to a device running a temporary server which may run inside a browser.

Services, files, folders, and entire drives can be shared with the virtual cloud. For example, a printer can be shared with the virtual cloud. This allows other devices on the virtual cloud to access the printer from anywhere. Similarly, any service can be made part of the virtual cloud including special services which the cloud itself may not understand (called a "raw service"). For a raw service, the cloud shows a name and a description associated with the raw service, and allows users to access the raw service with minimal or no interpretation. In some implementations, the cloud also shows what kinds of data the raw service can provide/accept.

For services that the cloud controller 21 understands, the cloud controller 21 may provide added services. For example, for a printer the cloud controller 21 can provide spooling and protocol translation from PDF to PCL, for example.

The cloud controller 21 wraps all services that go through it with a layer providing security, authentication of users, fine grained access control, and easily controlled sharing (for example, using a URL based token allowing a user to print a maximum number of pages within next hour at that URL). The cloud controller 21 may have a generic and universal layer that provides all these aspects to all devices and services on the internet that go through it.

In some implementations, devices that need services on other devices access the needed services through the cloud controller 21. In some implementations, smart embedded computers use the cloud controller 21 to find and get access to each other.

In some implementations, actual data transfer between devices is accomplished directly from one device to another device. The servers on two devices communicate with each other directly over the internet once the cloud controller 21 connects them. However, where such communication is not possible due to, for example, firewalls or NAT, the cloud controller 21 may act as a relay for data transfer.

In some implementations the cloud controller 21 provides a directory service to allow discovery of public services or for-pay services. The cloud controller 21 may also provide secure access and sharing of data along with mechanisms to identify alternative methods (fastest or cheapest or most reliable way) to access the data.

Figure 2:
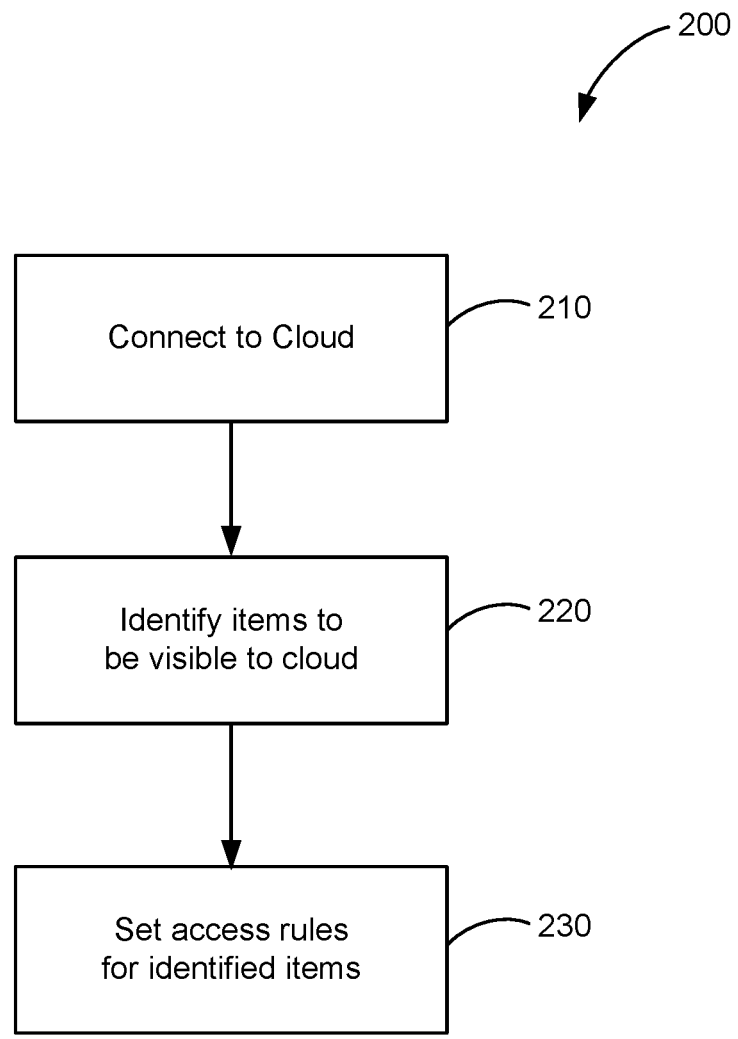
FIG. 2 is a flowchart diagram illustrating an implementation of a method of adding a device to a cloud computing network.

FIG. 2 is a flowchart diagram illustrating an implementation of a method of joining a device to a cloud computing network. The method 200 may be performed by a joining device, such as device 30, and a cloud controller, such as cloud controller 21.

In step 210, the joining device requests access to the cloud from the cloud controller. The joining device is authenticated by the cloud controller according to authentication protocols specific to the cloud. Once authenticated, the joining device is allowed to be in communication with the cloud controller. In addition, through the cloud controller, the joining device may connect with other devices which are also connected to the cloud. In some implementations, once connected, the joining device may communicate directly with other devices on the cloud.

In step 220, the joining device communicates to the cloud controller identification information related to data, software, services, or other items local to the joining device which are to be made available to the cloud. In response to receiving the identification information, the cloud controller communicates information identifying the data, software, services, and other items will to other devices on the cloud. Once available to the other devices on the cloud, the other devices may use the data, software, services, or other items local to the joining device.

In step 230, the joining device communicates to the cloud controller access control information for each of the data, software, services, and other items. In response to receiving the access control information, the cloud controller allows the other devices on the cloud to access the data, software, services, and other items according to the access control information. After authentication according to the access control information, the other devices on the cloud may use the data, software, services, or other items local to the joining device.

Figure 3:
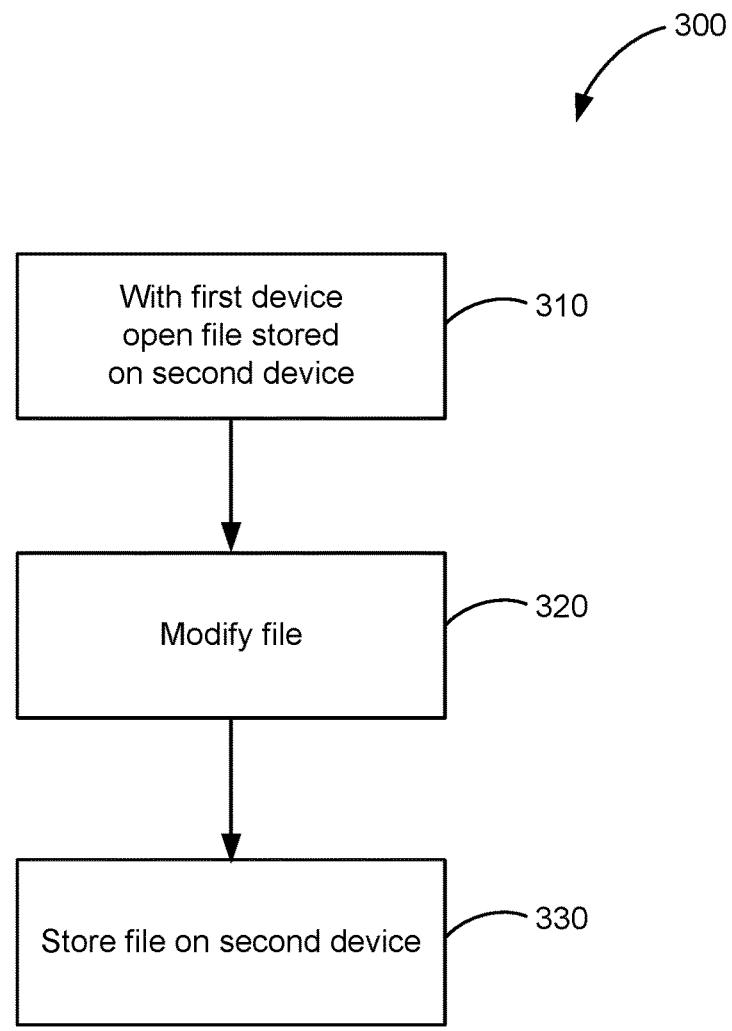
FIG. 3 is a flowchart diagram illustrating an implementation of a method of editing a file on a cloud computing network.

FIG. 3 is a flowchart diagram illustrating an implementation of a method of editing a file on a cloud computing network. The method 300 may be performed by a user device, such as device 30, a source device, such as device 30, and a cloud controller, such as cloud controller 21.

In step 310, the user device communicates to the cloud controller instructions to open a file stored on a source device. In response to the instructions, the cloud controller accesses the file on the source device, and provides the user device access to the file with appropriate file modification privileges.

In step 320, the user device modifies the file according to inputs from a user.

In step 330, the user device communicates to the cloud controller instructions to save the file. In response to the instructions, the cloud controller sends data representative of the modified file to the source device. The cloud controller also sends instructions to the source device to save the modified file. In response to receiving the instructions to save the modified file, the source device saves the modified file.

Figure 4:
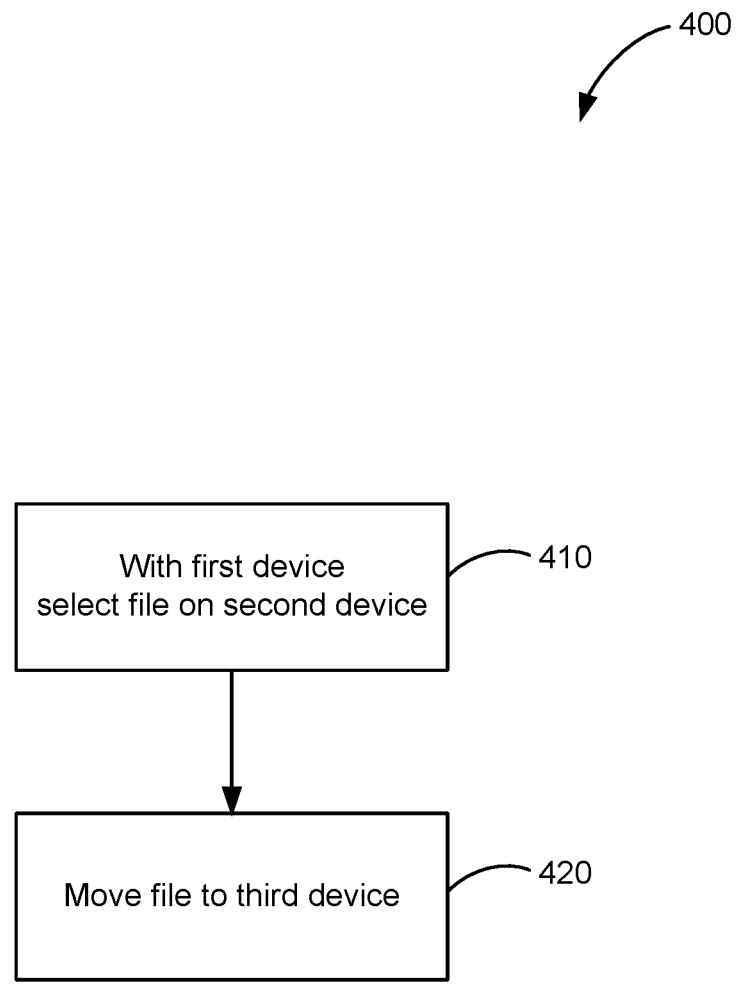
FIG. 4 is a flowchart diagram illustrating an implementation of a method of moving a file on a cloud computing network.

FIG. 4 is a flowchart diagram illustrating an implementation of a method of moving a file on a cloud computing network. The method 400 may be performed by a user device, such as device 30, a source device, such as device 30, a destination device, such as device 30, and a cloud controller, such as cloud controller 21. In some implementations, the source device is the user device.

In step 410, the user device communicates to the cloud controller instructions to select a file stored on a source device. In response to the instructions, the cloud controller accesses the file on the source device, and provides the user device access to the file with appropriate file modification privileges.

In step 420, the user device communicates to the cloud controller instructions to move the file to a destination device. In response to the instructions, the cloud controller sends data representative of the file to the destination device. The cloud controller also sends instructions to the destination device to save the file. In response to receiving the instructions to save the file, the source device writes the file to its memory. In some implementations, the cloud controller also sends instructions to the source device to delete the file. In response to receiving the instructions to delete the file, the source device deletes the file from its memory.

Figure 5:
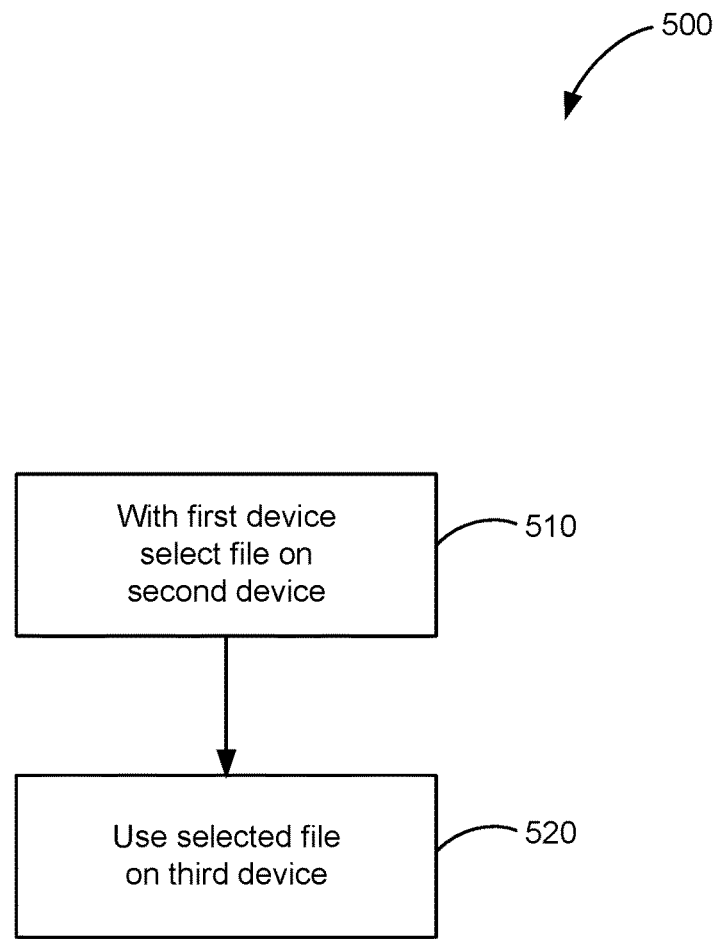
FIG. 5 is a flowchart diagram illustrating an implementation of a method of using a file on a cloud computing network.

FIG. 5 is a flowchart diagram illustrating an implementation of a method of using a file on a cloud computing network. The method 500 may be performed by a user device, such as device 30, a source device, such as device 30, a destination device, such as device 30, and a cloud controller, such as cloud controller 21.

In step 510, the user device communicates to the cloud controller instructions to select a file stored on a source device. In response to the instructions, the cloud controller accesses the file on the source device, and provides the user device access to the file with appropriate file modification privileges. In some implementations, the source device is the user device.

In step 520, the user device communicates to the cloud controller instructions to use the file on a destination device. In response to the instructions the cloud controller sends data representative of the file to the destination device. The cloud controller also sends instructions to the destination device to use the file. In response to receiving the instructions to save the file, the source device uses the file. For example, the destination device may be a printer located at a friend's house. In response to receiving the data and the instructions, the printer prints the file. As another example, the destination device may be a monitor or a television at a relative's house. In response to receiving the data and the instructions, the monitor or television displays the file, which may include still or video image data.

Figure 6:
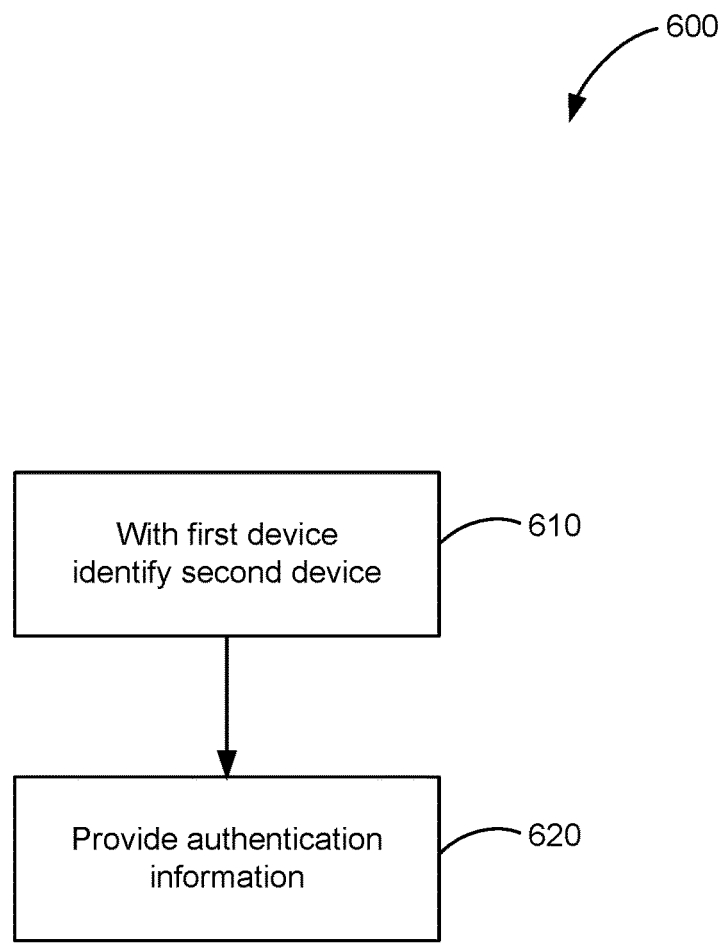
FIG. 6 is a flowchart diagram illustrating an implementation of a method of adding a device to a cloud computing network.

FIG. 6 is a flowchart diagram illustrating an implementation of a method of adding a device to a cloud computing network. The method 600 may be performed by a user device, such as device 30, a joining device, such as device 30, and a cloud controller, such as cloud controller 21.

In step 610, the user device provides access information for a joining device. In addition, the user device requests access to the cloud from the cloud controller for the joining device. In some implementations, the cloud controller sends an acknowledgment to the user device.

In step 620, the joining device is authenticated by the cloud controller according to authentication protocols specific to the cloud. In some implementations, the authentication process happens through communications between the cloud controller and the joining device. In some implementations, the user device provides authentication information on behalf of the joining device to the cloud controller. Once authenticated, the joining device is allowed to be in communication with the cloud controller. In addition, through the cloud controller, the joining device may connect with other devices which are also connected to the cloud. In some implementations, once connected, the joining device may communicate directly with other devices.

Figure 7A:
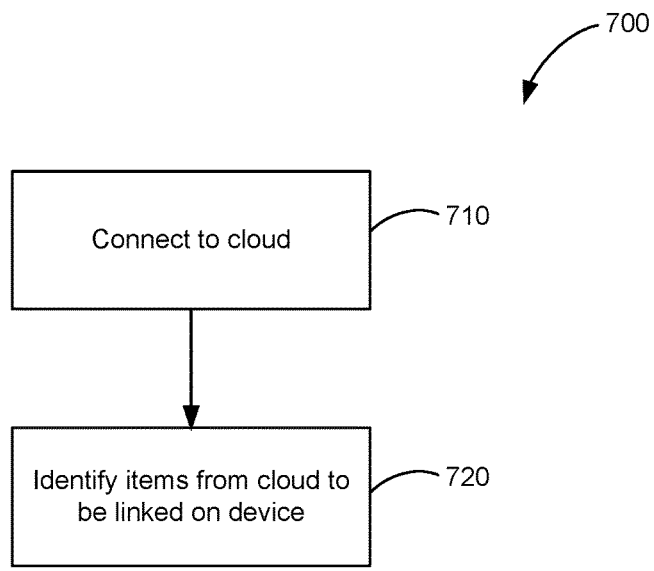
FIG. 7A is a flowchart diagram illustrating an implementation of a method of generating an index on a device connected to a cloud computing network.

FIG. 7A is a flowchart diagram illustrating an implementation of a method of generating an index on a device connected to a cloud computing network. The method 700 may be performed by a user device, such as device 30, and a cloud controller, such as cloud controller 21.

In step 710, the user device requests access to the cloud from the cloud controller. The user device is authenticated by the cloud controller according to authentication protocols specific to the cloud.

In step 720, the user device communicates instructions to the cloud controller which cause the cloud controller to provide information to the user device indicating data, software, services, and other items available to the user device through the cloud. In response to the instructions, the cloud controller provides the information. The user device receives input from a user indicating selections of one or more of the data, software, services, and other items. In response to the input, the user device stores links to the selected data, software, services, and other items. Once saved, the links are available for use to provide convenient access to the selected data, software, services, and other items on the cloud.

Figure 7B:
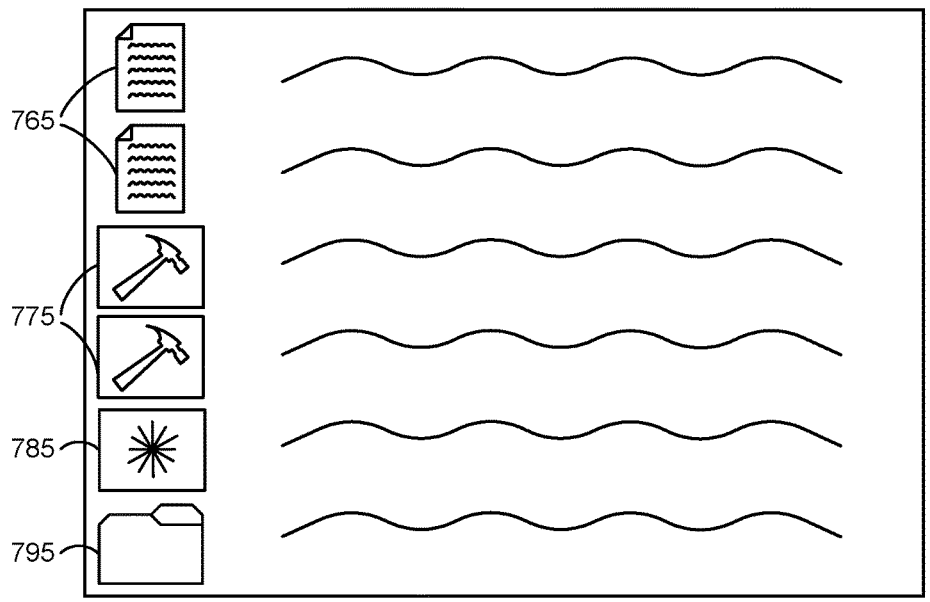
FIG. 7B is a flowchart diagram illustrating an example index regenerated using the method of 7A.

FIG. 7B is a diagram illustrating an example index generated using the method of 7A. As shown, index 755 includes links to various items. Links 765 allow convenient access to data stored on other devices in the cloud. Links 775 and 785 respectively allow convenient access to services, and software located on other devices in the cloud. Link 795 is a folder in which links to other data, software, services, and other items are located.

The links, as shown, maybe organized and arranged at the will of the user. Accordingly, links 765 may provide convenient access to data stored on different devices.

Figure 8:
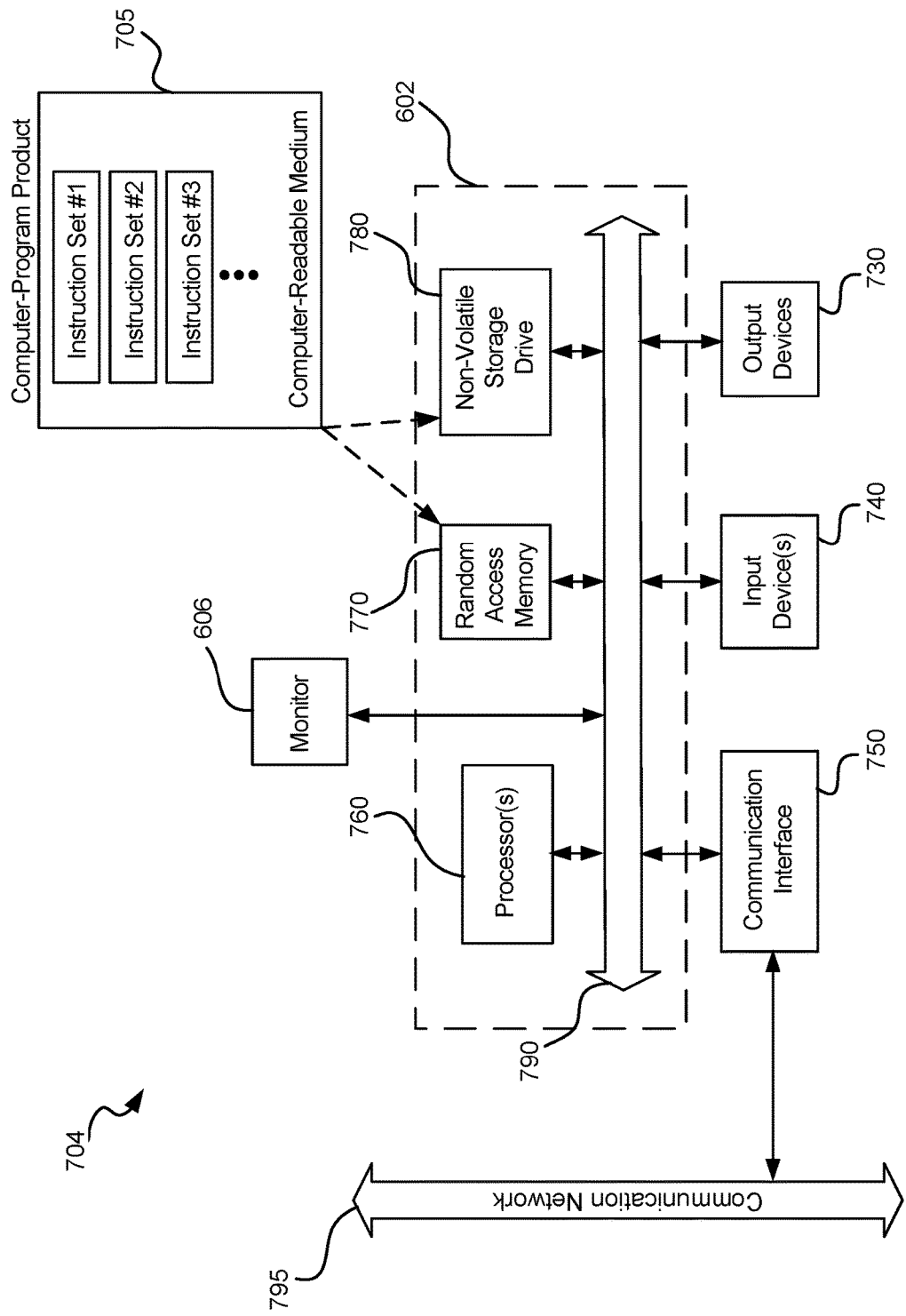
FIG. 8 is a block diagram illustrating an implementation of a device connected to a cloud computing network.

FIG. 8 is a block diagram illustrating an implementation of a computing device 704, such as the devices 30 or the cloud storage controller 21. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof.

Device 704 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program product 705 stored in a tangible computer-readable memory in computer 602. Computer-program product 705 directs device 704 to perform the above-described methods. Computer 602 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 780 or another computer-readable medium accessible to computer 602 and loaded into memory 770. Each processor 760 may comprise a microprocessor, such as a microprocessor from Intel® or Advanced Micro Devices, Inc.®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft® Corporation, Solaris® from Oracle®, LINUX, UNIX, and the like.

User input devices 740 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These may include a display (e.g., monitor 606), printers, non-visual displays such as audio output devices, etc.

Communications interface 750 provides an interface to other communication networks 795 and devices and may serve as an interface to receive data from and transmit data to other systems, WANs and/or the Internet. Embodiments of communications interface 750 typically include an Ethernet card, a modem (telephone, satellite, cable, ISDN), a (asynchronous) digital subscriber line (DSL) unit, a FireWire® interface, a USB®, interface, a wireless network adapter, and the like. For example, communications interface 750 may be coupled to a computer network, to a FireWire® bus, or the like. In other embodiments, communications interface 750 may be physically integrated on the motherboard of computer 602, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem may utilize multiple busses or communication paths within the computer 602.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While various embodiments of present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A cloud controller configured to manage access among devices connected to a cloud computing network, the cloud controller comprising:
    an input port configured to receive input data from a first device;
    an output port configured to transmit signals indicative of output data to the first device; and
    a processor configured to:
        via the input port, receive from the first device a request for access to the cloud computing network,
        in response to the request, authenticate the first device according to an authentication protocol and communicate the authentication to the first device via the output port,
        via the input port, receive from the first device an indication of one or more data files local to the first device to be made available to other devices on the cloud computing network,
        in response to the indication, provide information identifying the one or more data files to the other devices on the cloud computing network,
        via the input port, receive from a second device a request to access a particular data file of the first device, and
        in response to the request from the second device, granting the second device access to the particular data file,
        wherein the particular data file remains local to the first device before and after the second device is granted access.

2. The cloud controller of claim 1, wherein the processor is further configured to:
    via the input port, receive a request from the second device to store a modified version of the file on the first device;
    in response to the request, provide instructions to the first device which cause the modified file to be stored on the first device.

3. The cloud controller of claim 2, wherein the first device receives modifications for the modified file from the second device via the cloud controller.

4. The cloud controller of claim 2, wherein the first device receives modifications for the modified file directly from the second device.

5. The cloud controller of claim 1, wherein the input port is further configured to receive input data from a third device and the output port is configured to transmit signals indicative of output data to the third device, and wherein the processor is further configured to:
    via the input port, receive a request from the second device to move the file from the first device to the third device;
    in response to the request, provide instructions to at least one of the first device and the third device, wherein the instructions cause the file to be moved from the first device to the third device.

6. The cloud controller of claim 5, wherein the third device receives the file from the first device via the cloud controller.

7. The cloud controller of claim 5, wherein the third device receives the file directly from the first device.

8. The cloud controller of claim 1, wherein the input port is further configured to receive input data from a third device and the output port is configured to transmit signals indicative of output data to the third device, and wherein the processor is further configured to:
  via the input port, receive a request from the second device to use the file from the first device on the third device;
  in response to the request, provide instructions to at least one of the first device and the third device, wherein the instructions cause the file to be used on the third device.

9. The cloud controller of claim 8, wherein the third device receives the file from the first device via the cloud controller.

10. The cloud controller of claim 8, wherein the third device receives the file directly from the first device.

11. The network device of claim 8, wherein the file is an audio or video file and using the file comprises playing the file on the third device.

12. A network device configured to be connected to a cloud computing network, the network device comprising:
  an input port configured to receive input data from a cloud controller;
  an output port configured to transmit signals indicative of output data to the cloud controller; and
  a processor configured to:
    via the output port, transmit to the cloud controller a request for access to the cloud computing network,
    via the input port, receive from the cloud controller an authentication for access to the cloud computing network,
    in response to the authentication, via the output port, transmit to the cloud controller an indication of one or more data files local to the network device to be made available to other devices on the cloud computing network,
    via the input port, receive from the cloud controller instructions to grant a second device access to a particular one of the data files, and
    in response to the instructions, grant access to the second device to the particular data file, wherein the particular data file remains local to the first device before and after the second device is granted access.

13. The network device of claim 12, wherein the processor is further configured to:
  via the output port, transmit to the cloud controller a request to access a particular file on a third device; and
  via the input port, receive from the cloud controller an indication that access to the particular file on the third device has been granted.

14. The network device of claim 13, wherein the processor is further configured to:
  generate instructions for a modified version of the particular file, and
  via the output port, transmit a request to the cloud controller to store the modified version of the particular file on the third device.

15. The cloud controller of claim 14, wherein the processor is further configured to, via the output port, transmit the instructions for the modified particular file to the third device via the cloud controller.

16. The cloud controller of claim 14, wherein the processor is further configured to, via the output port, transmit the instructions for the modified particular file directly to the third device.

17. The network device of claim 13, wherein the processor is further configured to:
  via the output port, transmit a request to the cloud controller to move the particular file from the third device to a fourth device.

18. The network device of claim 13, wherein the processor is further configured to:
  via the output port, transmit a request to the cloud controller to use the particular file from the third device on a fourth device.

19. The network device of claim 18, wherein the particular file is an audio or video file and using the file comprises playing the file on the fourth device.

* * * * *